Figure 1:
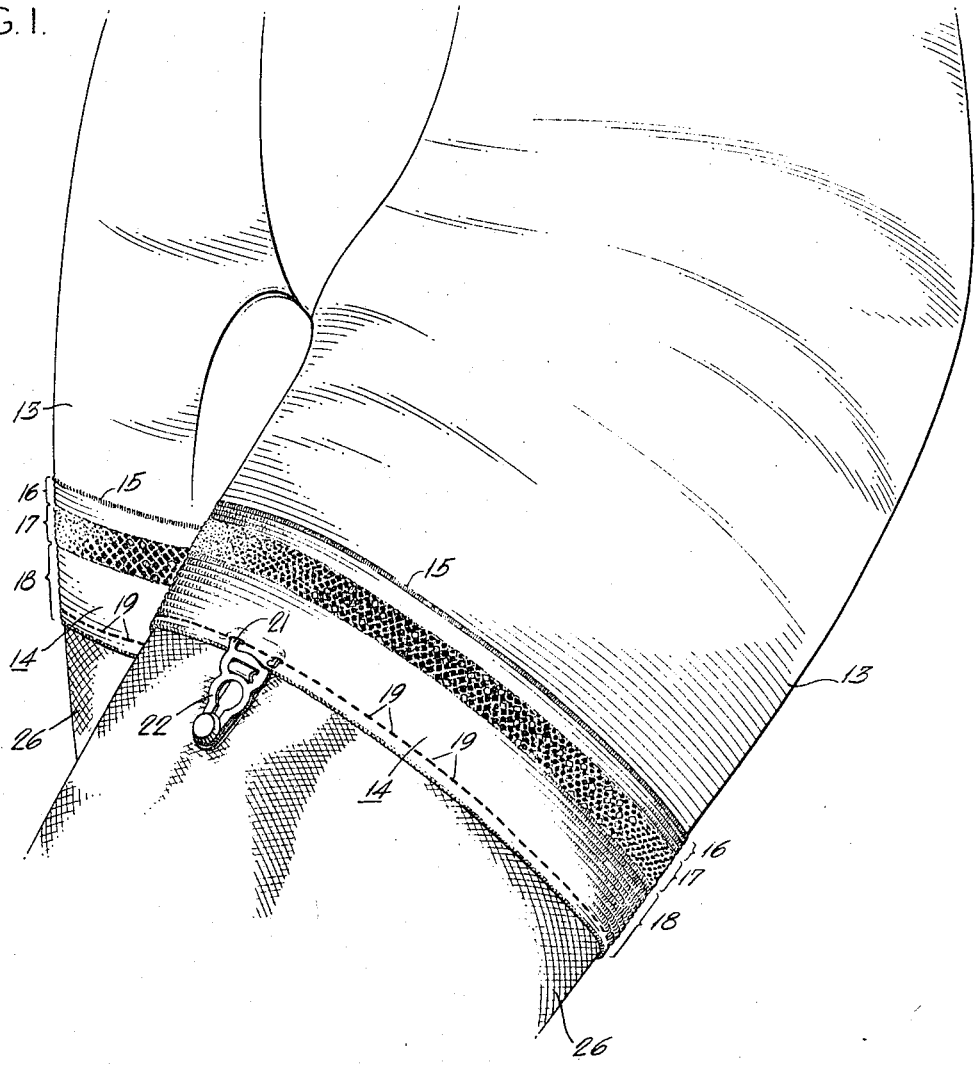
Figure 2:
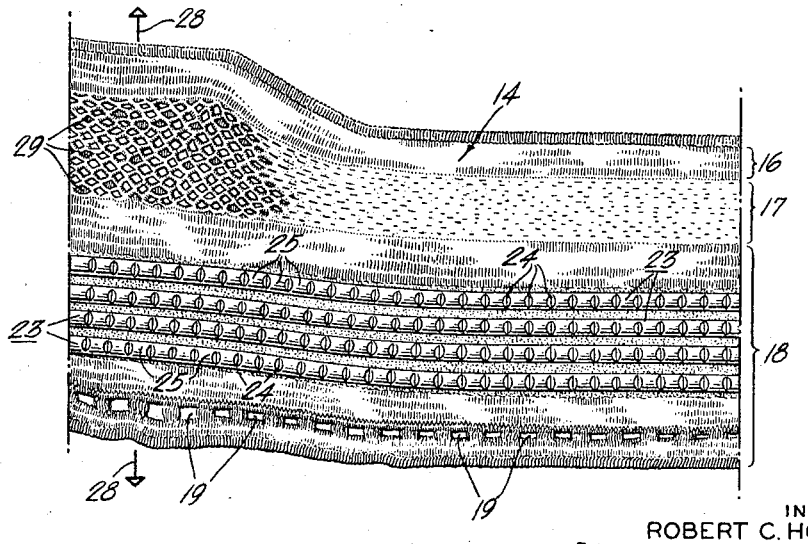
Figure 3:
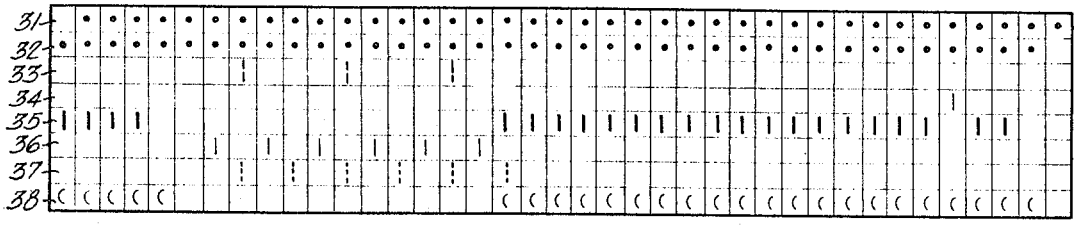
Figure 4:
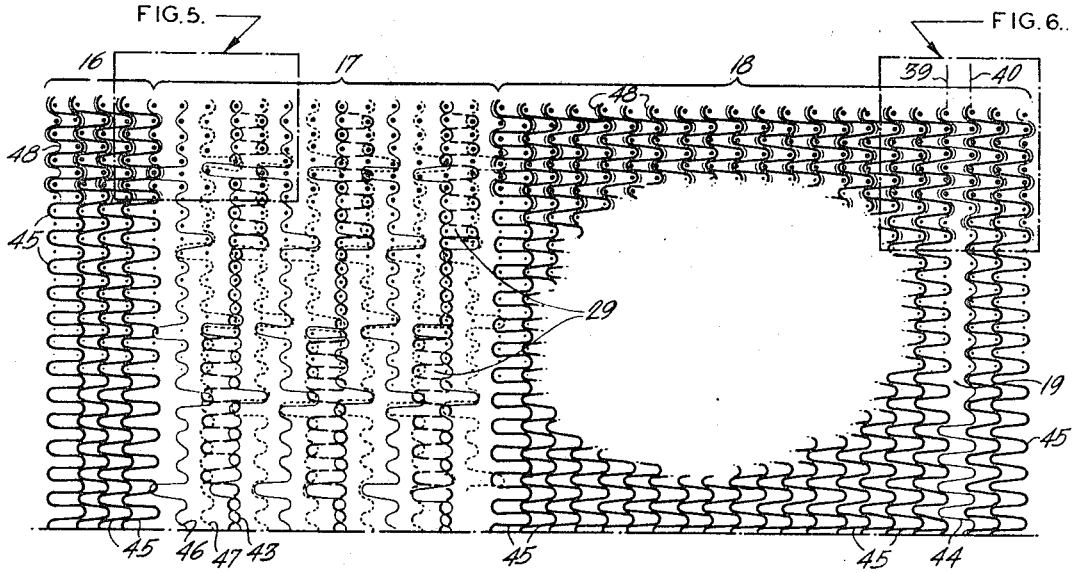
Figure 5:
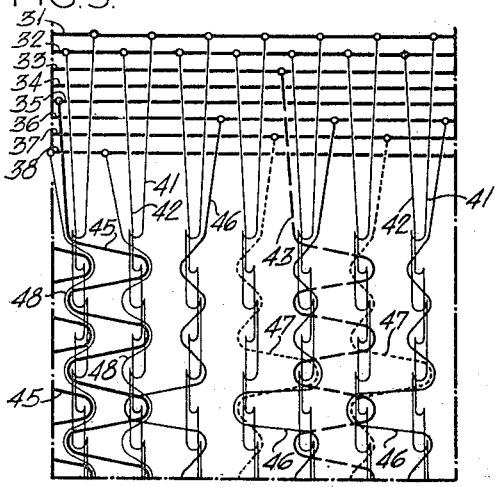
Figure 6:
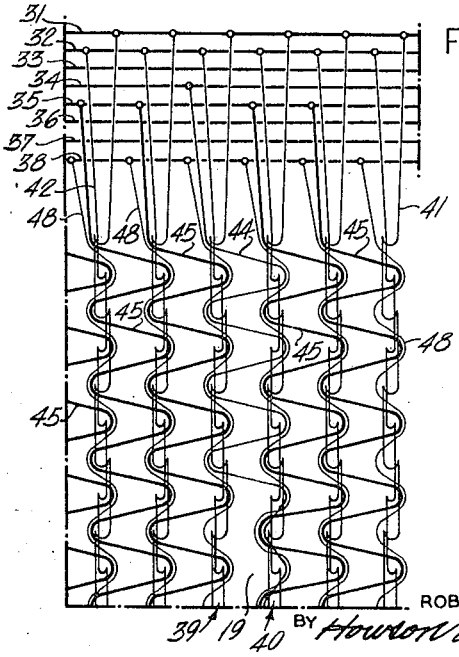
Figure 7:
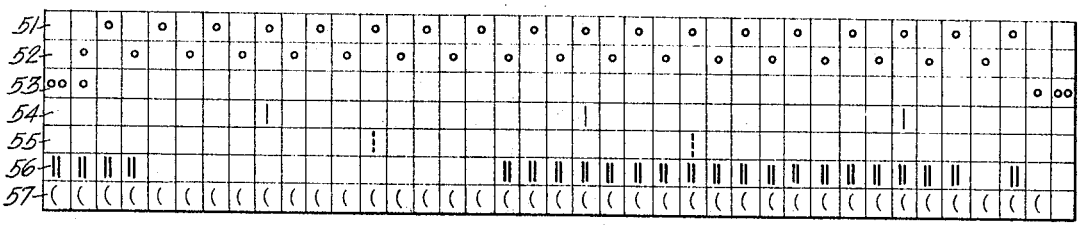
Figure 8:
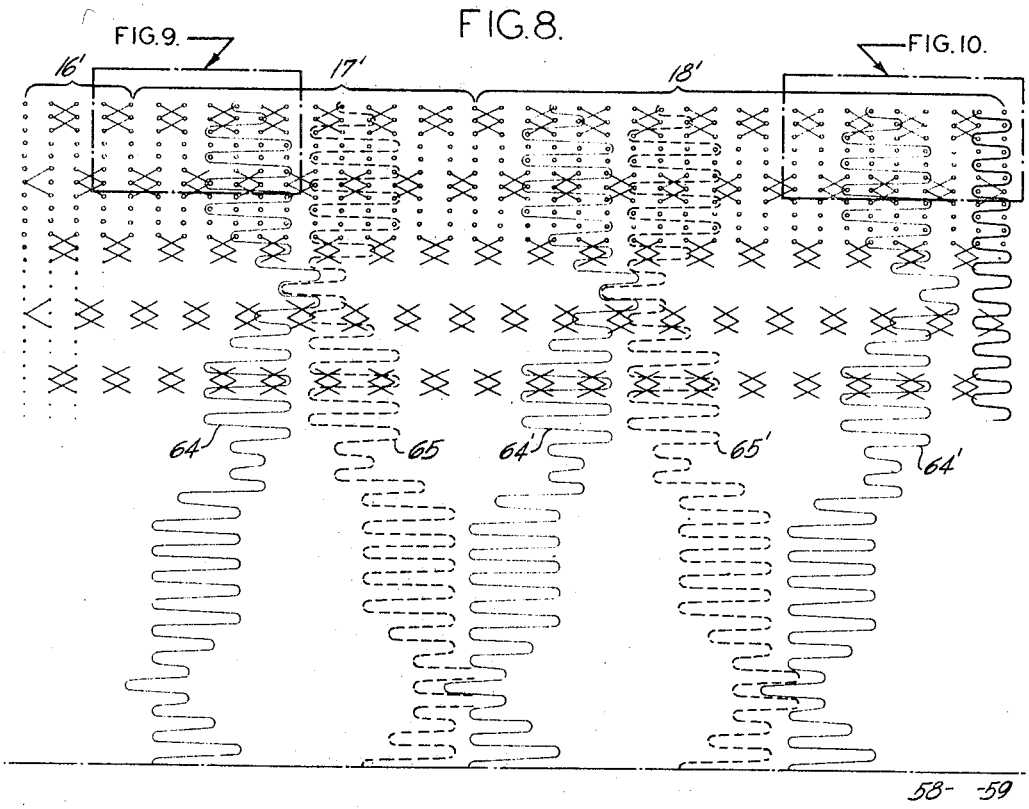
Figure 9:
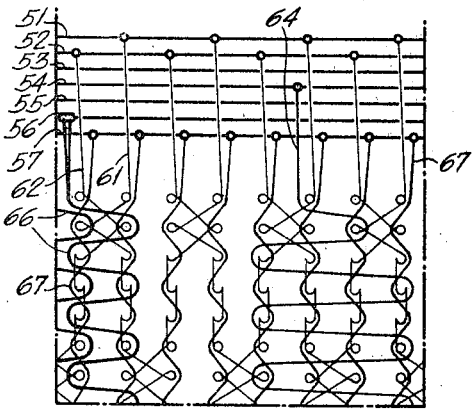
Figure 10:
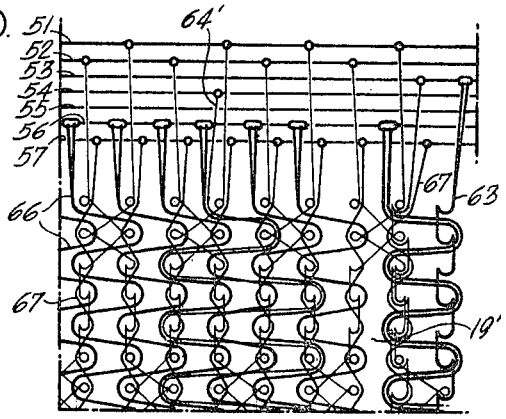

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 9, 1970

875 O.G. 341

T875,007
ANCHOR BAND

Robert C. Howard, Wyomissing, Pa., assignor to Wyomissing Corporation, Reading, Pa., a corporation of Pennsylvania

Filed Aug. 13, 1968, Ser. No. 752,205
Int. Cl. D04b *9/46*
U.S. Cl. 66—172
3 Sheets Drawings. 14 Pages Specification

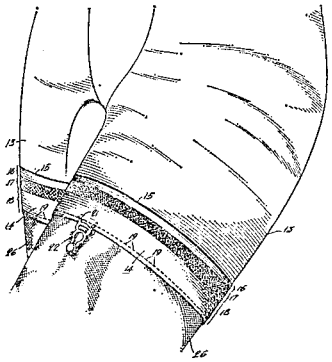

The disclosed anchor band 14 is an integrally knitted web having a narrow section 16 of substantially one-way stretch fabric which is designed to be sewn or otherwise attached to a garment or other article, in the present instance the girdle leg. Adjacent the narrow band of one-way stretch fabric, is a section 17 of two-way stretch fabric consisting of a knitted lace and preferably incorporating a decorative pattern. Beyond the two-way stretch section of the fabric is a wide band 18 of substantially one-way stretch fabric having on its inner surface a series of ribs or bands of foamed elastomeric gripping elements which are capable of anchoring the anchor band either to the flesh or to a garment positioned thereunder. Along the free edge of the latter section, a series of apertures 19 is formed during the knitting thereof. The apertures are designed to accommodate suitable fasteners, for example, the hooks 21 of conventional stocking supporters 22, so that one or more fasteners may be selectively engaged at any point along the band. The band is knitted so that the wales extend along the length of the band, with a covered elastomeric yarn incorporated in each wale of the band under a tension sufficient to produce the desired elasticity in the finished band. In the two-way stretch section of the band, any pattern yarns are preferably "textured" yarns which, because of the geometry of the yarn, exhibit the characteristics of being stretchable and capable of bulking when stretched and thereafter relaxed. Any pattern yarns in the substantially one-way stretch sections of the fabric are preferably rigid yarns of the same composition as the textured yarns but lacking the physical characteristics or geometry providing stretch.

June 9, 1970 R. C. HOWARD T875,007

ANCHOR BAND

Filed Aug. 13, 1968 3 Sheets-Sheet 1

INVENTOR:
ROBERT C. HOWARD
BY Howson & Howson
ATTYS.

ANCHOR BAND

Filed Aug. 13, 1968 3 Sheets-Sheet 2

INVENTOR:
ROBERT C. HOWARD
BY Howson & Howson
ATTYS.

ANCHOR BAND

Filed Aug. 13, 1968 3 Sheets-Sheet 3

INVENTOR:
ROBERT C. HOWARD
BY Howson & Howson
ATTYS.